MATERIAL HANDLING CALCULATOR-DEMONSTRATOR

Filed May 1, 1963 2 Sheets-Sheet 1

INVENTOR.
THOMAS HEALY
BY
MORGAN, FINNEGAN, DURHAM & PINE
ATTORNEYS

Feb. 16, 1965 T. A. HEALY 3,169,700

MATERIAL HANDLING CALCULATOR-DEMONSTRATOR

Filed May 1, 1963 2 Sheets-Sheet 2

INVENTOR.
THOMAS HEALY

BY

MORGAN, FINNEGAN, DURHAM & PINE

ATTORNEYS 3,169,700
MATERIAL HANDLING CALCULATOR-DEMONSTRATOR
Thomas A. Healy, 144 Winthrop St., Brooklyn, N.Y.
Filed May 1, 1963, Ser. No. 277,184
3 Claims. (Cl. 235—61)

This invention relates to a calculator for ascertaining material handling relationships and more particularly to a calculator for computing relationships between factors such as suspended loads, line dimension and sling configuration. By virtue of the geometry and data display arrangement of the calculator it combines and interrelates measuring and computing functions with indicating functions and may also serve as a demonstrator or training aid.

Sling operations which involve the handling and hoisting of substantial loads are inherently dangerous. They are carried out daily throughout the world by numerous people and equipment. The determination of the proper equipment for a particular load condition and the evaluation of the load handling ability of particular equipment is a complex task involving such factors as load weight and size, line dimension, line construction and attachment, and sling configuration. Personnel are frequently unskilled and equipment may be improperly used. The possibility of injury and property damage is thus considerable.

Whether the handling equipment is properly suited to the task or what handling equipment should be used, are basic questions constantly confronting material handling personnel. Sometimes rules of thumb are relied on; in other cases manuals must be referred to and various tables therein consulted. A type of calculator has also been proposed but is so complicated in construction and use as to discourage all but the most tenacious and erudite. As a result, the technique of guessing is widely practiced. With all of these complicated or dangerously inaccurate practices it is no surprise that accidents are frequent, bringing with them considerable property damage, frequent injury and sometimes loss of life.

It is thus one object of the invention to provide a simple, self-explanatory and readily manipulated calculator adapted to assist material handling personnel in the handling of suspended loads with slings.

Another object of the invention is to provide such a calculator which by computing relationships between factors such as load, sling configuration and line dimension, insures the proper matching of sling with load to thereby lessen the possibility of accidents.

Another object of the invention is to provide in such a calculator measuring means which coact with the calculator elements in such a manner that certain dimensional data are set into the calculator on the basis of the data provided by the measuring means.

A further object of the invention is to provide in such a calculator a data display arrangement which clearly and succinctly illustrates relationships between load and hoisting equipment whereby proper manipulation of the calculator is insured and demonstration and training in load handling is facilitated.

These and other objects and advantages of the invention such as the promotion of public safety will be set forth in part hereinafter and in part will be obvious herefrom, or may be learned by practise with the invention, the same being realized and attained by means of the instrumentalities, combinations and improvements pointed out in the appended claims.

The invention consists in the novel parts, constructions, arrangements, combinations, and improvements herein shown and described.

Serving to illustrate exemplary embodiments of the invention are the drawings of which:

Figure 1:
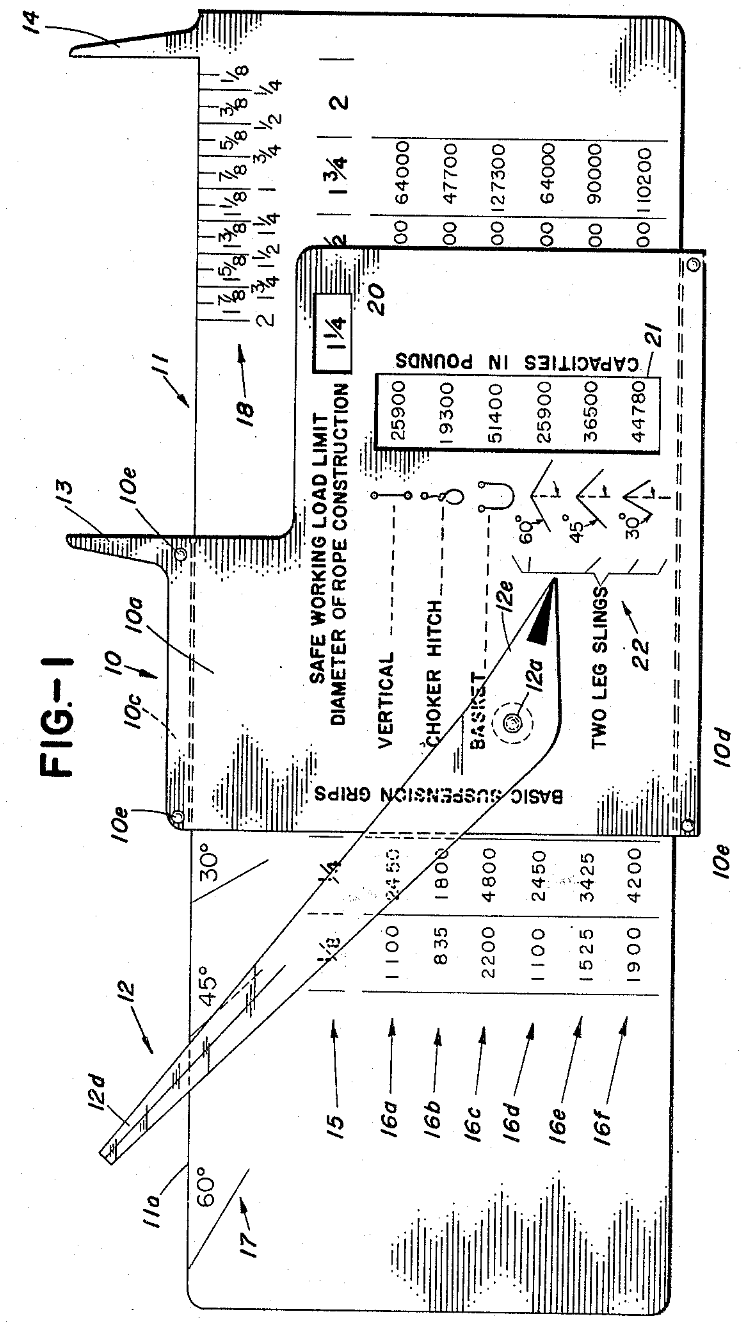
FIGURE 1 is a plan view and FIGURE 2 a side elevation view of one embodiment of the invention.

In the form illustrated in FIGURE 1 the invention comprises two relatively movable members 10 and 11, an angle measuring instrument and index 12 and a caliper instrument illustratively formed of two blades 13 and 14 conveniently formed as integral respective extensions of the members 10 and 11.

Member 11 bears data illustratively including a column of sling line dimension data 15 and, correlated therewith, a plurality of load columns **16*a*, 16*b*, 16*c* . . . 16*f*. Also provided on member 11 are angle data 17 adapted to cooperate with instrument 12, and scaled data 18 adapted to cooperate with caliper 13, 14 and in use typically providing line dimension data corresponding with the data of column 15**.

Member 10, which may serve relatively as a general indexing device, includes line dimension indicating means in registration with column 15 and embodied as a cut out portion 20, and load indicating means in registration with columns **16*a*, 16*b*, 16*c* . . . 16*f*, and embodied as a cut out portion 21; member 10 also includes sling configuration data 22 arranged adjacent and correlated with cutout 21 and thus correlated with columns 16*a*–16*f***.

Member 10 is conveniently constructed as spaced, parallel and generally flat sheets **10*a* and 10*b* separated by spacers 10*c* and 10*d* disposed along opposing edges of member 10. The components 10*a*, 10*b*, 10*c* and 10*d* are conveniently joined as by rivets 10*e* and the space defined by the elements adapted to receive member 11** in rectilinear slidable engagement.

The instrument 12, preferably of transparent material, is rotatably coupled to member 10 illustratively by means of a pivot pin **12*a* extending from a disc 12*b* which is secured as by adhesive to member 10. One section of lever 12 comprises a protractor blade 12*d* cooperating with angle data 17 and the reference edge 11*a* of member 11. On the opposite side of pivot 12*a* an index or pointer 12*e* is provided in indicating relationship with the sling configuration data 22**.

Several modes of operation may be carried out with the illustrated calculator. In order to determine what load a given sling arrangement can safely handle, members 10 and 11 are relatively positioned such that locator 20 delineates the diameter of the sling line in question. In the position illustrated in FIGURE 1 the selected diameter is 1¼" (it should be noted that the values herein provided generally relate to sling lines of wire rope construction).

The setting of locator 20 at the desired rope diameter automatically selects an aggregate of load data delineated by selector 21. At this point the appropriate sling configuration is identified whereby the particular load for the given rope diameter and sling configuration is satisfied. In the position illustrated in FIGURE 1 a rope diameter of 1¼" in a choker hitch sling configuration will safely hoist 19,300 pounds. With respect to two-legged slings, the protractor 12 can be set to conform to the sling in question whereupon pointer **12*e* identifies the corresponding load. Similarly, line daimeter may be measured by caliper 13, 14**.

The foregoing operations may be performed in the course of an actual material handling operation or may be practiced during training sessions with the calculator serving to illustrate the relationships between load, sling configuration and rope diameter.

Converse operations may also be employed. By positioning member 10 so that particular loads are identified with selector 21, the various sling configurations and line diameters applicable to such a load are clearly indicated.

Figure 3:
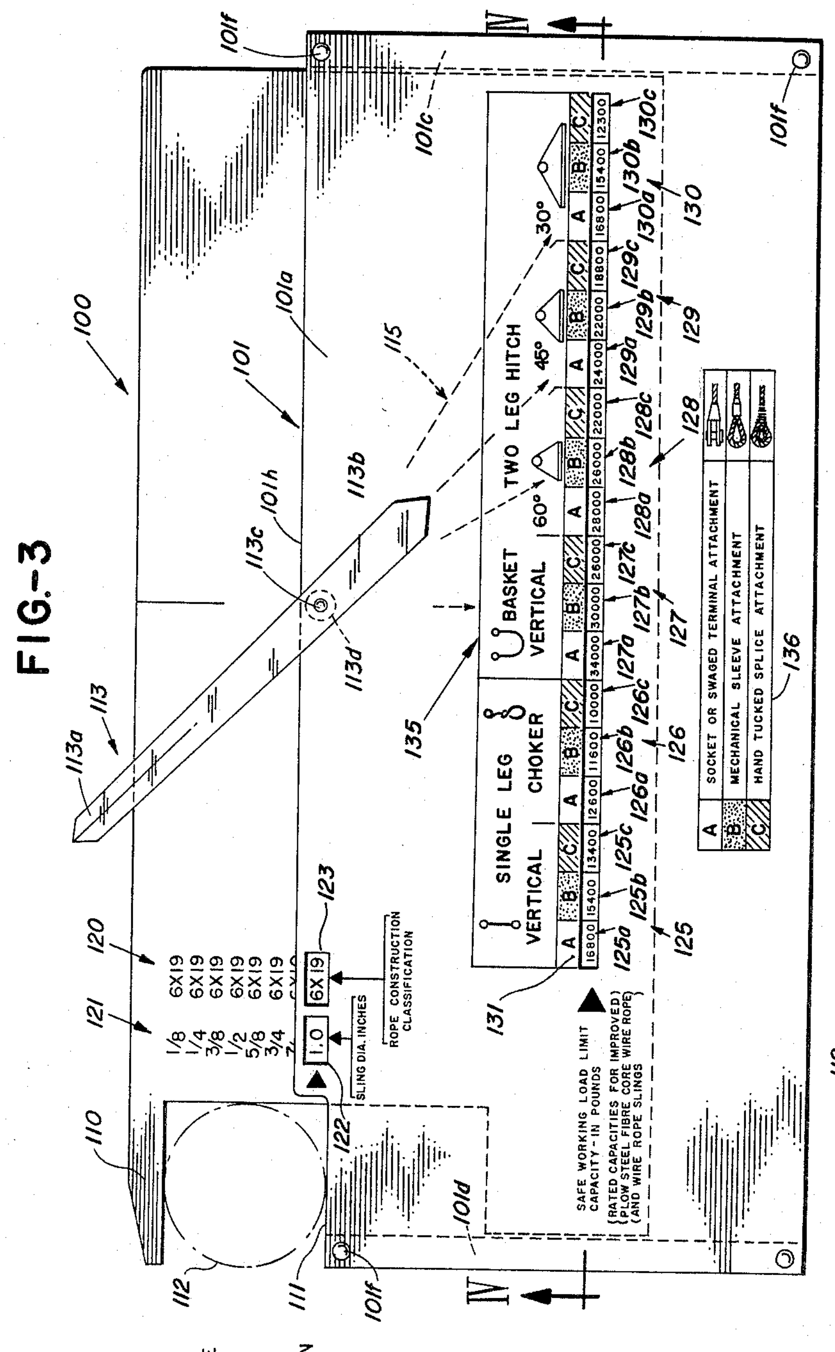
FIGURE 3 is a plan view and FIGURE 4 a side elevation view, partly in section, of another embodiment of the invention.
Figure 4:
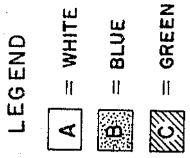
Figure 4:
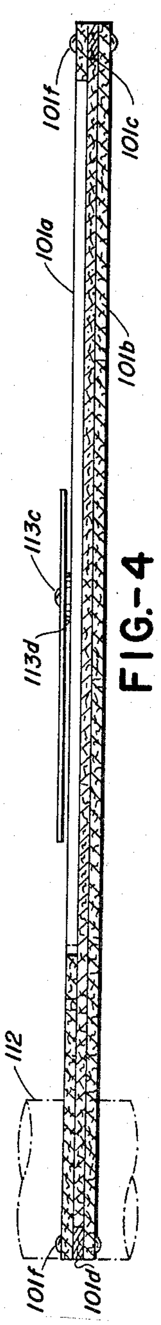

An alternate embodiment of the invention is illustrated in FIGURES 3 and 4. As seen therein, there is provided a member 100 in slidable engagement with overlapping member 101. The latter is conveniently formed of two parallel sheets 101*a* and 101*b* separated by spacing strips 101*c* and 101*d*. This assembly is joined at the four corners thereof as by rivets 101*f*. The member 100 is slidably disposed in the space defined by sheets 101*a* and 101*b*, and spacers 101*c* and 101*d*. Integral caliper means are provided and as embodied comprise an integral extension 110 of member 100 and the edge 111 of member 101. A rope 112 is illustratively being calipered by the coaction of members 110 and 111 and is an indicated diameter of 1″.

Rotatably mounted on member 101 is an angle measuring instrument and index 113 which includes a protractor blade 113*a* and in indicator 113*b*. The combination is rotatably secured to member 101 by way of pivot pin 113*c* which forms part of a disc 113*d* secured as by an adhesive to the surface of 101. Protractor blade 113*a* cooperates with the reference edge 101*h* of the member 101 and with angle data 115 laid out on 101 adjacent the edge 101*h*.

Member 100 bears columns of interrelated data 120 and 121. The latter supplies line dimension data, particular values of which are automatically identified and registered as a function of the setting of caliper 110, 111. The particular value appears by way of an indicator embodied as a cut out region 122 of member 101. The related line construction data, which specifies rope strand geometry, is similarly identified and registered automatically, being indicated by way of cut out region 123 of member 101.

Member 100 also bears a plurality of sets of load columns 125, 126 . . . 130. Each set, e.g. 125, has a plurality of load columns, e.g. 125*a*, 125*b* and 125*c*. Particular values of load in each column are indicated by way of a cut out region 131 in member 101. The load values in each column are correlated with the line dimension data 121 and with the setting of caliper 110, 111. Each set of columns 125, 126 . . . 130 is related to a particular sling configuration indicated by the sling data 135 provided on member 101 adjacent indicator 131. Particular sling configurations are indicated by pointer 113*b*. Each column, e.g. 125*a*, is correlated with attachment data associated with each sling configuration, this data being presented in coded form "A," "B," "C," explained by a legend 136 provided on member 101; color coding is also conveniently provided as indicated by the hatching pattern provided on the code symbols "A," "B," "C," on the legend 136, and on the respective columns 125*a*, 125*b*, 125*c*, 126*a*, 126*b* . . . 130*c*.

Figure 2:
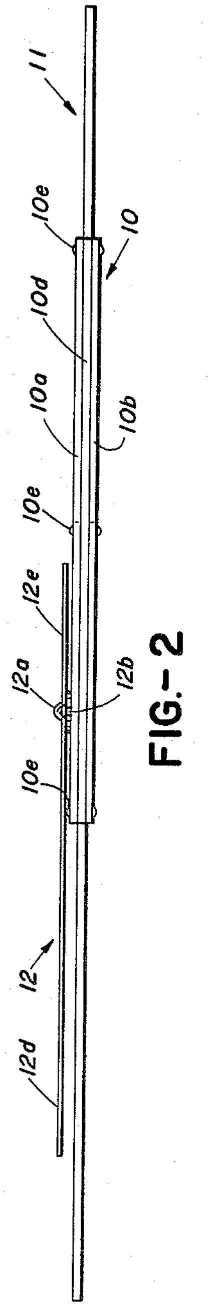

The operation of the embodiment illustrated in FIGURES 3 and 4 is in certain respects similar to that of FIGURES 1 and 2, it being noted that in the calculator of FIGURES 3 and 4, the setting of caliper 110, 111, automatically sets the indicators 122, 123 and 131. It may also be noted that the embodiment of FIGURES 3, 4 yields additional data including line construction and sling attachment factors.

In the study and practice of the invention, modifications will undoubtedly occur to those skilled in the art.

The invention is accordingly not limited to the specific mechanisms shown and described but departures may be made therefrom within the scope of the accompanying claims without departing from the principles of the invention and without sacrificing its chief advantages.

What is claimed is:

1. A calculating and demonstrating device for use in computing the relationship between a suspended load and the sling dimension and configuration therefor in material handling operations comprising a data display member bearing a plurality of sets of data, each set providing sling line dimension data correlated with load for a given sling configuration, and indexing means slidable with respect to said data display member and in overlapping relation therewith, said indexing means including line dimension indicating means for indicating particular sling line dimension data on said display means, plural load indicating means in fixed relationship with said line dimension indicator means for indicating an aggregate of load data corresponding with said line dimension data, sling configuration data selector means correlated with said load indicating means for indicating in said aggregate load data, load values related to sling configuration, angle measuring means comprising blade means rotatably coupled to said indexing means and further comprising said data selector means, and caliper means having a pair of separable blades, one of said blades being fixed to said data display member and the other to said indexing means.

2. A device as claimed in claim 1 in which said blade means is oriented on said indexing means in relation to sling data in such a manner that the adjustment of said blade means yields automatically the corresponding sling configuration.

3. A device for calculating the relationship between the factors of load, line dimension and sling configuration comprising a data-bearing scale having a line dimension column and an interrelated plurality of parallel-disposed load columns arranged parallel with said line dimension column, said load columns being correlated with said sling configurations, and an indexing scale in rectilinear slidable engagement with said data-bearing scale and having a dimension indicator registered with said line dimension column for identifying a particular line dimension, a plurality of load indicators in registration with the respective load columns, a plurality of sling configuration identifiers arranged adjacent said load indicators and correlated with said load columns, whereby the applicable load for a given line dimension and sling configuration, and vice versa, are automatically computed by appropriate positioning of said indexing scale relative to said data-bearing scale, angle measuring and indicating means comprising a blade rotatably coupled to said indexing scale and in indicating relationship with at least certain of said sling configuration identifiers and a reference line on said data-bearing scale whereby measured angle is correlated with the respective sling configuration, and a first caliper blade on said indexing scale and a cooperating second caliper blade on said data-bearing scale, said blades being positioned relative to said line dimension column such that line dimension data correspond to the separation of said blades.

References Cited by the Examiner

UNITED STATES PATENTS

| | | | |
|---|---|---|---|
| 1,342,288 | 6/20 | Ichiba | 33—143 |
| 2,654,538 | 10/53 | Fuller | 235—61 |
| 2,694,262 | 11/54 | Daniel | 33—143 X |
| 2,812,582 | 11/57 | Achbach | 33—143 |
| 2,874,478 | 2/59 | Faulconer | 235—70 X |
| 3,000,102 | 9/61 | Snyder | 33—143 |
| 3,060,585 | 10/62 | Kirk | 33—143 |

LEO SMILOW, *Primary Examiner.*